(12) United States Patent
Lepper et al.

(10) Patent No.: US 10,724,560 B2
(45) Date of Patent: Jul. 28, 2020

(54) FASTENER MOUNTING ASSEMBLY

(71) Applicant: ILLINOIS TOOL WORKS INC., Glenview, IL (US)

(72) Inventors: Mark O. Lepper, Oak Park, IL (US); James T. Kirchen, Chippewa Falls, WI (US); Stephen M. Everard, Lake Orion, MI (US); Brian R. Peek, Prescott, AZ (US)

(73) Assignee: Illinois Tool Works Inc., Glenview, IL (US)

( * ) Notice: Subject to any disclaimer, the term of this patent is extended or adjusted under 35 U.S.C. 154(b) by 423 days.

(21) Appl. No.: 15/118,540

(22) PCT Filed: Jan. 22, 2015

(86) PCT No.: PCT/US2015/012399
§ 371 (c)(1),
(2) Date: Aug. 12, 2016

(87) PCT Pub. No.: WO2015/126565
PCT Pub. Date: Aug. 27, 2015

(65) Prior Publication Data
US 2017/0218991 A1    Aug. 3, 2017

Related U.S. Application Data

(60) Provisional application No. 61/942,256, filed on Feb. 20, 2014, provisional application No. 62/025,248, filed on Jul. 16, 2014.

(51) Int. Cl.
*B60R 13/02* (2006.01)
*F16B 5/06* (2006.01)
(Continued)

(52) U.S. Cl.
CPC .............. *F16B 5/0657* (2013.01); *F16B 5/04* (2013.01); *F16B 5/10* (2013.01)

(58) Field of Classification Search
CPC .. F16B 5/04; F16B 5/0657; F16B 5/10; B60R 2011/0071; B60R 13/0206; B60R 13/02;
(Continued)

(56) References Cited

U.S. PATENT DOCUMENTS 4,312,165 A * 1/1982 Mizusawa ........... B60R 13/0206
411/510
4,505,611 A * 3/1985 Nagashima ......... B60R 13/0206
24/290
(Continued)

FOREIGN PATENT DOCUMENTS

| EP | 0641939 A1 | 3/1995 |
| EP | 2374643 A1 | 10/2011 |
| GB | 2077864 A | 12/1981 |

OTHER PUBLICATIONS

ISR and WO for PCT/US2015/012399 dated Apr. 15, 2015.

*Primary Examiner* — Michael P Ferguson
(74) *Attorney, Agent, or Firm* — Quarles & Brady LLP

(57) ABSTRACT

A fastener mounting assembly is configured to securely mount to at least one panel of a component. The fastener mounting assembly may include a base, a fastener mount extending from the base, and at least one panel-engaging member connected to one or both of the base and the fastener. The panel-engaging member(s) is configured to securely engage the panel(s) of the component to securely lock the fastener mounting assembly to the panel(s).

8 Claims, 8 Drawing Sheets

(51) Int. Cl.
*F16B 5/04* (2006.01)
*F16B 5/10* (2006.01)

(58) Field of Classification Search
CPC .. B60R 13/04; Y10T 24/309; Y10T 403/7039
USPC .......................................................... 403/361
See application file for complete search history.

(56) References Cited

U.S. PATENT DOCUMENTS

| | | | | |
|---|---|---|---|---|
| 5,695,296 | A * | 12/1997 | Miura | B60R 19/24 |
| | | | | 403/2 |
| 5,795,118 | A * | 8/1998 | Osada | B29C 65/0672 |
| | | | | 411/171 |
| 6,049,952 | A | 4/2000 | Mihelich et al. | |
| 6,336,768 | B1 * | 1/2002 | Kraus | B60R 13/0206 |
| | | | | 24/297 |
| 6,431,585 | B1 * | 8/2002 | Rickabus | B60R 21/215 |
| | | | | 24/114.05 |
| 6,813,865 | B2 * | 11/2004 | Peterson | B60R 13/0206 |
| | | | | 296/39.1 |
| 7,114,221 | B2 * | 10/2006 | Gibbons | F16B 5/065 |
| | | | | 24/289 |
| 7,237,995 | B2 * | 7/2007 | Randez Perez | F16B 5/065 |
| | | | | 24/293 |
| 7,828,372 | B2 * | 11/2010 | Ellison | B60R 13/04 |
| | | | | 24/297 |
| 8,677,573 | B2 * | 3/2014 | Lee | B60R 13/0206 |
| | | | | 24/289 |
| 9,022,447 | B2 * | 5/2015 | Schidan | B60R 13/0243 |
| | | | | 296/1.08 |
| 9,145,909 | B2 * | 9/2015 | Lepper | F16B 5/0657 |
| 9,216,703 | B2 * | 12/2015 | Lauxen | B60R 13/0206 |
| 9,657,807 | B2 * | 5/2017 | Morris | F16B 5/0628 |
| 9,670,947 | B2 * | 6/2017 | Bachelder | B60R 13/0206 |
| 9,739,298 | B2 * | 8/2017 | Fellows | F16B 17/00 |
| 9,873,388 | B2 * | 1/2018 | Meyers | B29C 45/16 |
| 2004/0016088 | A1 * | 1/2004 | Angellotti | F16B 5/065 |
| | | | | 24/297 |
| 2005/0150087 | A1 * | 7/2005 | Lydan | B29C 45/1676 |
| | | | | 24/297 |
| 2006/0000064 | A1 * | 1/2006 | Leverger | F16B 5/0628 |
| | | | | 24/297 |
| 2006/0032030 | A1 * | 2/2006 | Nessel | B60R 13/0206 |
| | | | | 24/289 |
| 2006/0242802 | A1 * | 11/2006 | Scroggie | B60R 13/0206 |
| | | | | 24/297 |
| 2008/0138169 | A1 * | 6/2008 | Jackson | F16B 5/0642 |
| | | | | 411/450 |
| 2009/0249587 | A1 * | 10/2009 | Donahue-Yan | B60R 13/0206 |
| | | | | 24/297 |
| 2009/0249923 | A1 * | 10/2009 | Seidel | F16B 5/0628 |
| | | | | 81/61 |
| 2009/0307883 | A1 * | 12/2009 | Schliessner | F16B 5/0685 |
| | | | | 24/584.1 |
| 2011/0058915 | A1 * | 3/2011 | Scroggie | F16B 5/0642 |
| | | | | 411/32 |
| 2011/0243686 | A1 | 10/2011 | Sakai | |
| 2013/0255065 | A1 * | 10/2013 | Bachelder | B60R 13/0206 |
| | | | | 29/525.01 |
| 2013/0270868 | A1 * | 10/2013 | Tejero Salinero | F16B 5/02 |
| | | | | 296/191 |

\* cited by examiner

FASTENER MOUNTING ASSEMBLY

RELATED APPLICATIONS

This application is a National Phase of International Application No. PCT/US2015/012399, filed Jan. 22, 2015, and relates to and claims priority benefits from U.S. Provisional Patent Application No. 61/942,256, filed Feb. 20, 2014, and U.S. Provisional Patent Application No. 62/025,248, filed Jul. 16, 2014.

FIELD OF EMBODIMENTS OF THE DISCLOSURE

Embodiments of the present disclosure generally relate to a fastener mounting assembly, and, more particularly, to a fastener mounting assembly that may be secured to at least one panel of a structural component.

BACKGROUND

Various components are secured together through fasteners. For example, in the automotive industry, trim panels are secured to vehicle frames through fasteners, such as screws, bolts, and/or the like.

Often, fasteners are positioned within tight spaces between components of a system, structure, or the like. The process of engaging and tightening the fasteners may be awkward and/or difficult. In many applications, one or both of the components themselves include a specific structural fastener interface that is configured to receive a particular fastener. Intricate and specific tooling is often used to form the structural fastener interface on the component(s). Accordingly, the process of manufacturing a particular component(s) often includes forming the particular structural fastener interface on the component, which adds time, complexity, and cost to the manufacturing process.

SUMMARY OF EMBODIMENTS OF THE DISCLOSURE

Certain embodiments of the present disclosure provide a fastener mounting assembly configured to securely mount to at least one panel of a component. The fastener mounting assembly may include a base, a fastener mount extending from the base, and at least one panel-engaging member connected to one or both of the base and the fastener. The panel-engaging member(s) is configured to securely engage the panel(s) of the component to securely lock the fastener mounting assembly to the panel(s).

In at least one embodiment, the base includes first and second surfaces, with the fastener mount extending outwardly from the first surface. The at least one panel-engaging member may include a plurality of panel-engaging legs extending outwardly from the second surface, wherein a panel is configured to be secured within a gap between two of the plurality of panel-engaging legs. The fastener mounting assembly may include a pin-receiving sleeve extending from an end of the base, and a pin moveably retained within the pin-receiving sleeve. The pin may be configured to pass through each of the panel-engaging legs and each panel to securely connect the fastener mounting assembly to the panel(s). The pin may include a head connected to a serrated shaft having a beveled piercing tip. Each of the panel-engaging legs may include a flat beam and an inwardly-canted tip extending from a distal end of the flat beam. The fastener mounting assembly may also include a stabilizing block extending outwardly from the second surface between at least two of the panel-engaging legs. The fastener mounting assembly may also include at least one locating ridge configured to be retained within at least one divot formed in the panel(s).

The fastener mount may be configured to accommodate a wide variety of fasteners. In at least one embodiment, the fastener mount may include opposed lateral walls connected to an end wall and a canopy. A fastener-receiving channel may be formed through the canopy. The fastener-receiving channel may include a circular central opening that connects to an inlet that angles outwardly from the central opening toward an open end that is distally located from the end wall.

In at least one embodiment, the at least one panel-engaging member may include a plurality of panel engagers extending from the second surface between shroud walls. Each of the panel engagers may include an inner curved wall connected to an end wall. The end wall connects to an outer curved wall. At least one panel gap is defined between the inner curved wall, the end wall, and the outer curved wall. Each of the panel engagers may also include a central locating beam configured to be retained by a locating sleeve of the component. Each of the panel engagers may include one or both of a cutting feature or protuberance configured to securely engage a panel(s) as the fastener mounting assembly is rotated in relation to the panel(s) toward a securing position.

In at least one embodiment, the at least one panel-engaging member may include at least one heat stake channel. The fastener mounting assembly is configured to be heat staked to at least a portion of the at least one panel positioned in the heat stake channel(s).

In at least one embodiment, the fastener mounting assembly may include a securing collar. The fastener mount may include at least one deflectable retention wing. The securing collar is configured to slide over surfaces of the fastener mount to deflect the deflectable retention wing(s) onto a surface of the panel(s). The panel-engaging member(s) may include a first piercing member extending from an inner surface of the deflectable retention wing(s). The first piercing member is configured to pierce the first surface of the panel(s) in response to the securing collar deflecting the retention wing(s) onto the first surface. The at least one panel-engaging member may also include a second piercing member extending from an inner surface of the securing collar. The second piercing member is configured to pierce a second surface of the panel(s) in response to the securing collar deflecting the retention wing(s) onto the first surface.

Certain embodiments of the present disclosure provide a system that may include a component including a surface having at least one panel extending from the surface, and a fastener mounting assembly that securely mounts to the panel(s) of the component. The fastener mounting assembly may include a base, a fastener mount extending from the base, and at least one panel-engaging member connected to one or both of the base and the fastener. The panel-engaging member(s) securely engages the panel(s) of the component to securely lock the fastener mounting assembly to the panel(s).

Figure 1:
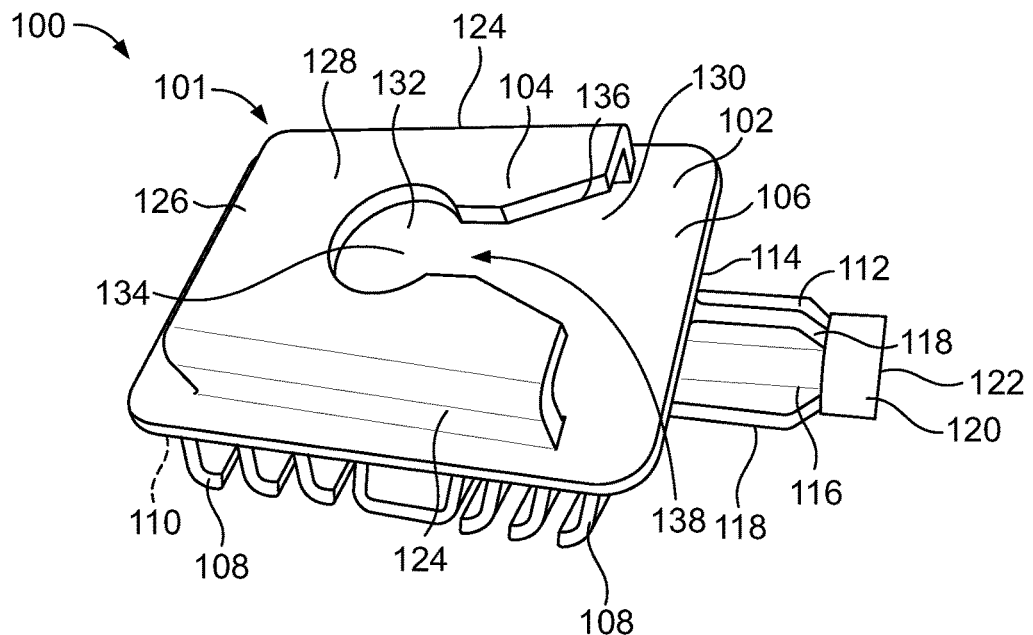
FIG. 1 illustrates a perspective top view of a fastener mounting assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

FIG. 1 illustrates a perspective top view of a fastener mounting assembly 100, according to an embodiment of the present disclosure. The fastener mounting assembly 100 may include a main body 101 including a flat, planar base 102 that supports a fastener mount 104 extending upwardly from a top surface 106, and panel-engaging members, such as panel-engaging legs 108, that extend downwardly from a bottom surface 110. A pin-receiving sleeve 112 extends below the bottom surface 110 and outwardly extends from an end 114. The pin-receiving sleeve 112 may be connected to a panel-engaging leg 108 and/or the bottom surface 110 of the base 102.

The pin-receiving sleeve 112 may include an outer tubular wall 116 that defines an interior passage (hidden from view) formed therethrough. One or more planar strengthening ribs 118 may extend radially outward from the tubular wall 116. The pin-receiving sleeve 112 is configured to receive and retain a shaft of a pin 120, which includes a head 122 secured to the shaft. The interior passage defined by the tubular wall 116 may be threaded and configured to threadably engage an outer threaded surface of the shaft of the pin 120. Alternatively, the interior passage may be a smooth interior bore.

The fastener mount 104 may include opposed lateral walls 124 connected to an end wall 126 and an upper canopy 128. An end 130 of fastener mount 104 that is opposite from the end wall 126 may be open. A fastener-receiving channel 132 may be formed through the upper canopy 128. The fastener-receiving channel 132 may include a circular central opening 134 that connects to an inlet 136 that angles outwardly from the central opening 134 toward the end 130. A fastener-retention chamber 138 is defined between the top surface 106, interior surfaces of the lateral walls 124, interior surfaces of the end wall 126, and a bottom surface of the upper canopy 128. In operation, a portion of a fastener, such as a head of a bolt, is slid into the fastener-retention chamber 138 so that the portion of the fastener is trapped underneath the upper canopy 128 with a shaft portion extending upwardly out of the central opening 134. Alternatively, the fastener mount 104 may be various other types of fastener mounts, such as a circular opening, a hinged latch, a threaded collar, and/or various other types of configurations.

The fastener mounting assembly 100 may be integrally molded and formed as a single piece, or may be formed as separate and distinct pieces that are secured together. For example, the main body 101 may be integrally molded and formed as a single piece of injection-molded plastic. The pin 120 may be a separately formed piece of metal, for example. Alternatively, the main body 101 may be formed of metal. Also, alternatively, the pin 120 may be formed of plastic.

Figure 2:
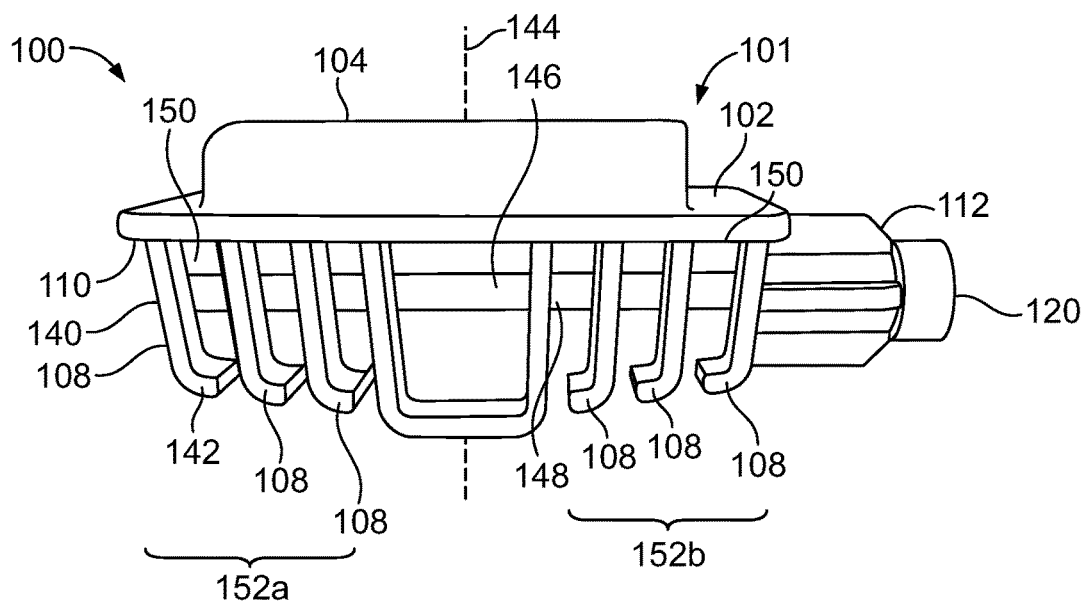
FIG. 2 illustrates a lateral view of a fastener mounting assembly, according to an embodiment of the present disclosure.

FIG. 2 illustrates a lateral view of the fastener mounting assembly 100. As noted, the panel-engaging legs 108 extend downwardly from the bottom surface 110 of the base 102. Each panel-engaging leg 108 may include a flat beam 140 that may be perpendicular to the bottom surface 110. An inwardly-canted tip 142 angles toward a central axis 144 of the fastener mounting assembly 100. A stabilizing block 146 may extend downwardly from the bottom surface 110 between sets of panel-engaging legs 108. The shaft 148 of the pin 120 may extend through the beams 140 of the panel-engaging legs 108 and the stabilizing block 146.

The panel-engaging legs 108 are spaced apart from one another so that a panel, such as a wall, rib, fin, sheet, or the like, may be positioned within a gap 150. For example, a panel may be sandwiched between a tip 142 of an outer panel-engaging leg 108 and a flat beam 140 of an adjacent inner panel-engaging leg 108. As shown in FIG. 2, the fastener mounting assembly 100 includes six total panel-engaging legs 108. One set 152a of panel-engaging legs 108 are configured to secure to three panels (with an innermost panel abutting against a surface of the stabilizing block 146), while another set 152b of panel-engaging legs 108 are configured to secure to three different panels (with an innermost panel abutting against a surface of the stabilizing block 146). The length and thickness of each panel-engaging leg 108 may be greater or lesser than shown, depending on the size and shape of the panels. Further, the fastener mounting assembly 100 may include more or less panel-engaging legs 108 than shown, depending on the number of panels to which the fastener mounting assembly 100 is configured to secure. Further, the stabilizing block 146 may be sized and shaped differently than shown, depending on the spacing between the separate groups of panels. Alternatively, the stabilizing block 146 may not be used. For example, the fastener mounting assembly 100 may be configured to secure to six panels that are evenly spaced from one another, instead of two groups of panels separated by a larger gap.

Figure 3:
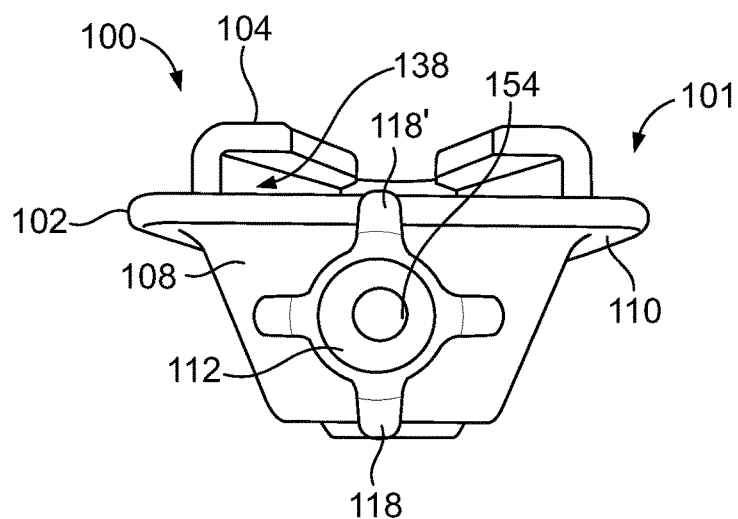
FIG. 3 illustrates an end view of a fastener mounting assembly, according to an embodiment of the present disclosure

FIG. 3 illustrates an end view of the fastener mounting assembly 100, according to an embodiment of the present disclosure. The interior passage 154 is formed through the pin-receiving sleeve 112. An upper rib 118' may extend through a length of the fastener mounting assembly 100 underneath the bottom surface 110 and may form a guide rib that is configured to be received and retained by guide divots formed in panels, as described below.

Figure 4:
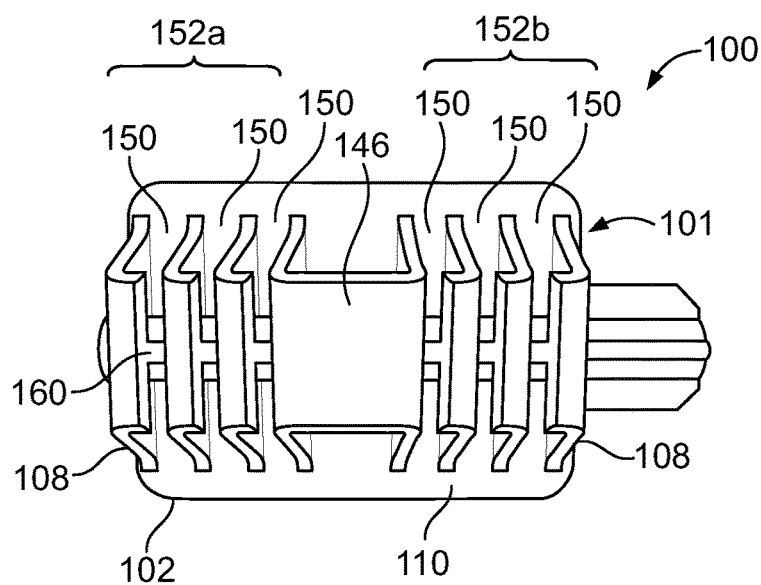
FIG. 4 illustrates a bottom view of a fastener mounting assembly, according to an embodiment of the present disclosure.

FIG. 4 illustrates a bottom view of the fastener mounting assembly 100, according to an embodiment of the present disclosure. As noted, the gaps 150 are defined between the panel-engaging legs 108. A locating ridge 160, which may be an extension of the upper rib 118' (shown in FIG. 1), extends below the bottom surface 110 between the panel-engaging legs 108 and the stabilizing block 146.

Figure 5:
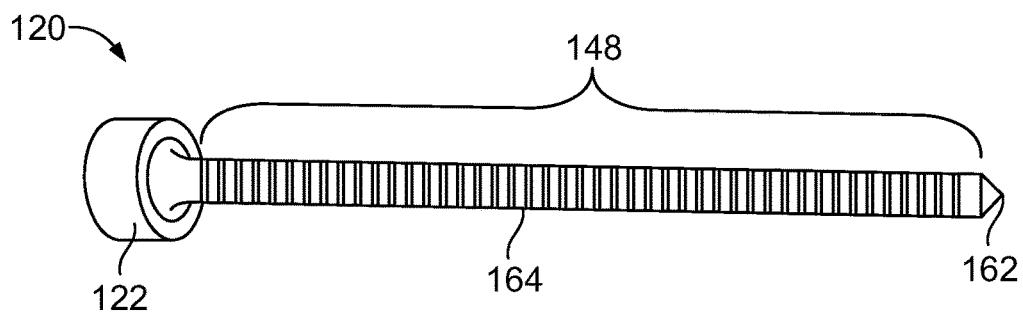
FIG. 5 illustrates a perspective lateral view of a pin, according to an embodiment of the present disclosure.

FIG. 5 illustrates a perspective lateral view of the pin 120, according to an embodiment of the present disclosure. The pin 120 includes the head 122 connected to the shaft 148. A distal end of the shaft 148 includes a beveled piercing tip 162, which is configured to pierce through panels, for example. The shaft 148 is configured to be driven through holes formed through the panel-engaging legs 108 (shown in FIGS. 1-4). An outer surface of the shaft 148 may include serrations 164 that are configured to cut through portions of panels as the shaft 148 is driven therethrough. Alternatively, the shaft 148 may not include the serrations 164. The serrations 164 may also be configured to lock the pin 120 in position with respect to a fastener mounting assembly. Also, alternatively, the shaft 148 may not include the piercing tip 162. Instead, holes may be formed through panels that are configured to slidably receive the shaft 148.

Figure 6:
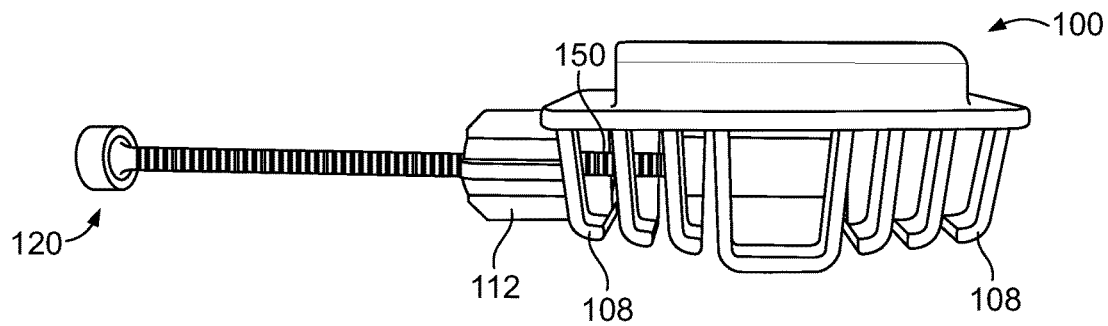
FIG. 6 illustrates a lateral view of a fastener mounting assembly with a pin removed from panel-engaging legs, according to an embodiment of the present disclosure.

FIG. 6 illustrates a lateral view of the fastener mounting assembly 100 with the pin 120 removed from the panel-engaging legs 108, according to an embodiment of the present disclosure. As shown, the pin 120 is retained by the pin-receiving sleeve 112, but is removed from the panel-engaging legs 108 and is not positioned within any gap 150. In order to securely mount the fastener mounting assembly 100 to panels, the gaps 150 are first aligned with respective panels of a component.

Figure 7:
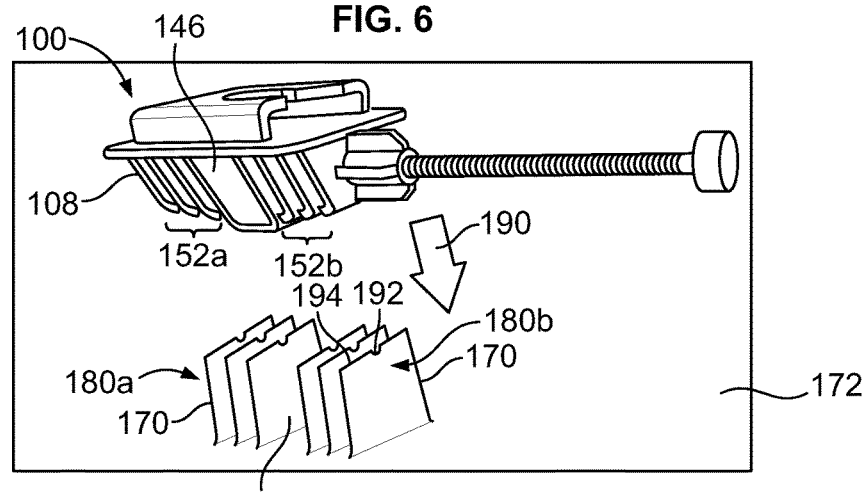
FIG. 7 illustrates a perspective view of a fastener mounting assembly aligned in relation to panels extending from a component, according to an embodiment of the present disclosure.

FIG. 7 illustrates a perspective view of the fastener mounting assembly 100 aligned in relation to panels 170 extending from a component 172, according to an embodiment of the present disclosure. As shown, two sets 180a and 180b of three panels 170 each are separated by an extended spacing 184. The set 152a of panel-engaging legs 108 are positioned over the first set 180a of the panels 170, while the set 152b of panel-engaging legs 108 are positioned over the second set 180b of the panels 170. Further, the stabilizing block 146 is positioned over the extended spacing 184. The stabilizing block 146 is sized and shaped to fit into the extended spacing 184 between the sets 180a and 180b of panels, such that end surfaces may abut into interior surfaces of inner panels 170 of opposite sets 180a and 180b. In order to securely mount the fastener mounting assembly 100 to the panels 170, the fastener mounting assembly 100 is lowered onto the panels 170 in the direction of arrow 190.

As shown, each panel 170 may be a flat, planar wall, beam, rib, fin, or the like extending from the component 172. Each panel 170 may include a locating divot 192 on an outer edge 194. The locating divot 192 is configured to receive and retain a portion of the locating ridge 160 (shown in FIG. 4) of the fastener mounting assembly 100 in order to properly locate and orient the fastener mounting assembly 100 on the panels 170.

While the panels 170 are shown as linear, flat structures, it is to be understood that the panels 170 may be sized and shaped differently, such as curved, circular, irregular or the like structures. If, for example, the panels 170 are circular, the panel-engaging legs 108 may be sized and shaped accordingly, such as semi-circular or circular.

Figure 8:
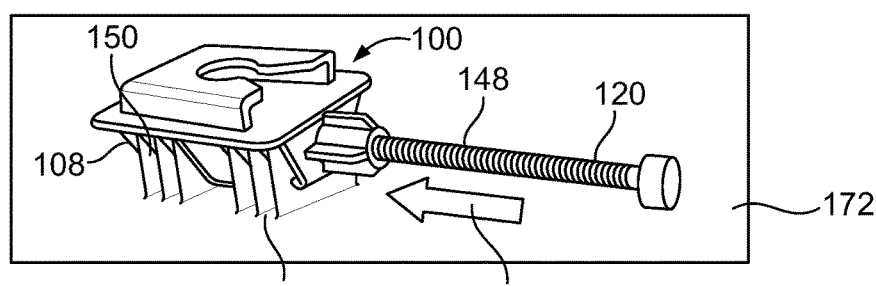
FIG. 8 illustrates a perspective view of a fastener mounting assembly positioned on panels extending from a component, according to an embodiment of the present disclosure.

FIG. 8 illustrates a perspective view of the fastener mounting assembly 100 positioned on the panels 170 extending from the component 172, according to an embodiment of the present disclosure. As shown, the panel-engaging legs 108 trap the panels 170 within gaps 150. The locating ridge 160 (shown in FIG. 4) is retained within the aligned locating divots 192 of the panels 170 (shown in FIG. 7). After the fastener mounting assembly 100 is mounted on the panels 170 as shown in FIG. 8, the pin 120 may be driven inwardly in the direction of arrow 196, such as with a tool or by hand. As the piercing tip 162 (shown in FIG. 5) is driven through the panels 170, the piercing tip 162 pierces through the panels 170 and the serrated shaft 148 may further dig into internal edges of the holes formed through the panels 170. In this manner, the pin 120 securely attaches the fastener mounting assembly 100 to the panels and securely locks the fastener mounting assembly 100 to the panels.

Figure 9:
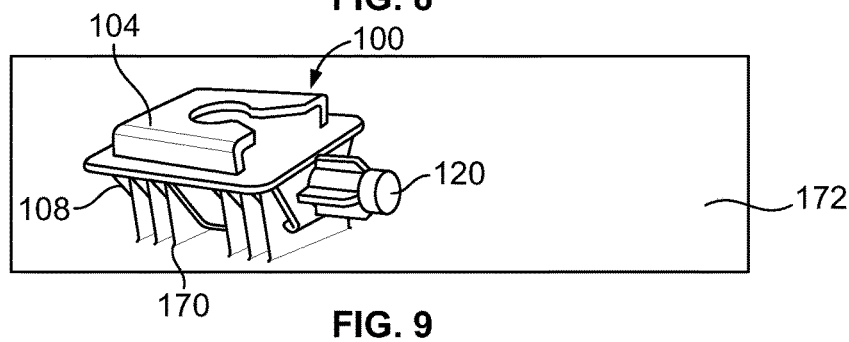
FIG. 9 illustrates a perspective view of a fastener mounting assembly secured to panels of a component, according to an embodiment of the present disclosure.

FIG. 9 illustrates a perspective view of the fastener mounting assembly 100 secured to the panels 170 of the component 172 according to an embodiment of the present disclosure. After the fastener mounting assembly 100 is secured to the panels 170, a fastener may be connected to the fastener mount 104, as described above.

Alternatively, the fastener mounting assembly 100 may not include the pin 120. Instead, the pin-engaging legs 108 may securely connect to the panels 170, such as through an interference fit. Optionally, each pin-engaging leg 108 may include a sharp edge on the tip 142 (shown in FIG. 2) that digs into a panel and provides a robust and secure connection therewith. Also, optionally, each pin-engaging leg 108 may include securing protuberances, such as studs, spikes, or the like, that dig into a panel to provide a secure connection therewith.

Figure 10:
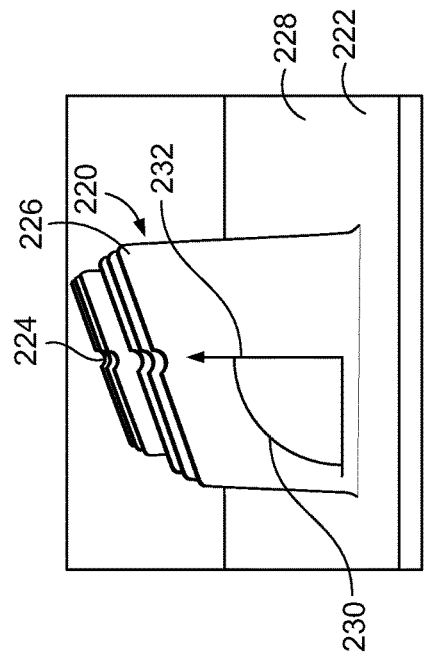
FIG. 10 illustrates a perspective lateral view of panels extending from a component, according to an embodiment of the present disclosure.

FIG. 10 illustrates a perspective lateral view of panels 200 extending from a component 202, according to an embodiment of the present disclosure. The fastener mounting assembly 100 may be secured to the panels 200. The panels 200 include locating divots 204 at an upper edge 206, which is generally parallel to a surface 208 of the component 202. Further, the panels 200 may be fully upright, such that an angle 210 between the surface 208 and a central longitudinal axis 212 is 90°. Alternatively, the panels 200 may be oriented in various other configurations.

Figure 11:
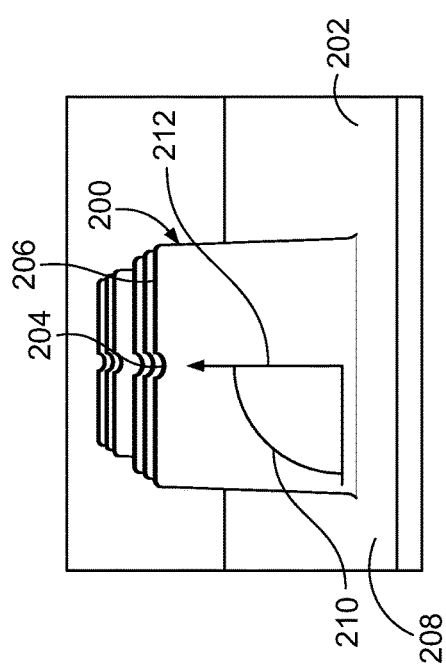
FIG. 11 illustrates a perspective lateral view of panels extending from a component, according to an embodiment of the present disclosure.

FIG. 11 illustrates a perspective lateral view of panels 220 extending from a component 222, according to an embodiment of the present disclosure. The fastener mounting assembly 100 may be secured to the panels 220. The panels 220 include locating divots 224 at an upper edge 226, which is angled with respect to a surface 228 of the component 222. Further, the panels 220 may be fully upright, such that an angle 230 between the surface 228 and a central longitudinal axis 232 is 90°. Alternatively, the panels 220 may be oriented in various other configurations.

Figure 12:
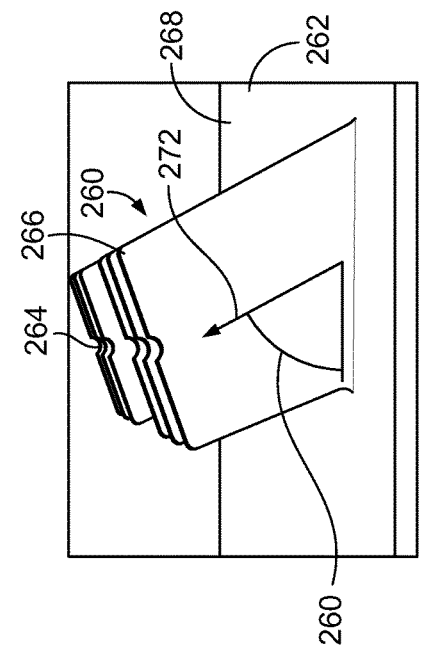
FIG. 12 illustrates a perspective lateral view of panels extending from a component, according to an embodiment of the present disclosure.

FIG. 12 illustrates a perspective lateral view of panels 240 extending from a component 242, according to an embodiment of the present disclosure. The fastener assembly 100 may be secured to the panels 240. The panels 240 include locating divots 244 at an upper edge 246, which is generally parallel to a surface 248 of the component 242. Further, the panels 240 may be angled with respect to the surface 248, such that an angle 250 between the surface 248 and a central longitudinal axis 212 is not 90°. For example, the angle 250 may be between 5°-75°. Alternatively, the panels 240 may be oriented in various other configurations.

Figure 13:
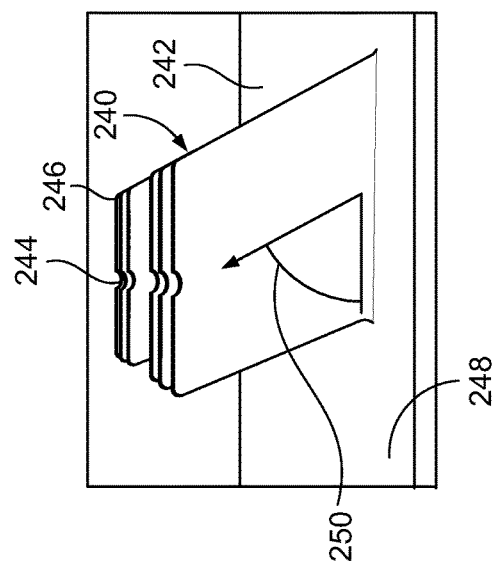
FIG. 13 illustrates a perspective lateral view of panels extending from a component, according to an embodiment of the present disclosure.

FIG. 13 illustrates a perspective lateral view of panels 260 extending from a component 262, according to an embodiment of the present disclosure. The fastener mounting assembly 100 may be secured to the panels 260. The panels 260 include locating divots 264 at an upper edge 266, which may be angled with respect to a surface 268 of the component 262. Further, the panels 260 may be angled with respect to the surface 268, such that an angle 260 between the surface 268 and a central longitudinal axis 272 is not 90°. For example, the angle 260 may be between 5°-75°. Alternatively, the panels 260 may be oriented in various other configurations.

Figures 14, 15:
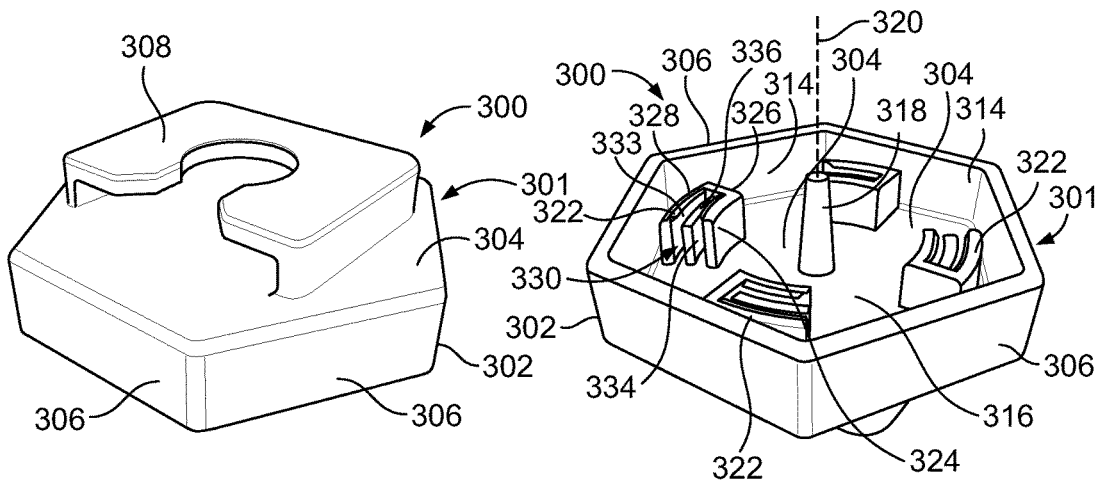
FIG. 14 illustrates a perspective top view of a fastener mounting assembly, according to an embodiment of the present disclosure.
FIG. 15 illustrates a perspective bottom view of a fastener mounting assembly, according to an embodiment of the present disclosure.

FIG. 14 illustrates a perspective top view of a fastener mounting assembly 300, according to an embodiment of the present disclosure. The fastener mounting assembly 300 includes a main body 301 having a base 302. The base 302 includes a flat upper wall 304 that connects to shroud walls 306 that downwardly extend from outer edges of the wall 304. As shown, the base 302 may be in the shape of a hexagon. Alternatively, the base 302 may be formed as various other shapes, such as a square, circle, triangle, or the like. A fastener mount 308, such as described above, extends upwardly from the upper wall 304.

FIG. 15 illustrates a perspective bottom view of the fastener mounting assembly 300, according to an embodiment of the present disclosure. A panel-engaging chamber 312 is defined between interior surfaces 314 of shroud walls 306 and a bottom surface 316 of the upper wall 304. A central locating beam 318 extends downwardly from the bottom surface 316 and is generally centered about a central longitudinal axis 320 of the fastener mounting assembly 300.

A plurality of panel-engaging members, such as panel engagers 322, extend downwardly from the bottom surface 316. Each panel engager 322 includes an inner curved wall 324 connected to an end wall 326, which, in turn, connects to an outer curved wall 328. An end 330 opposite the end wall 326 is open and connects to panel gaps 333 and 334 separated by an intermediate curved wall 336. The panel gap 333 is defined between an inner surface (for example, closer to the central axis 320) of the outer curved wall 328, an inner surface of the end wall 326, and an outer surface (for example, closer to a wall 306) of the intermediate curved wall 336. The panel gap 334 is defined by the inner surface of intermediate curved wall 336, an inner surface of the end wall 326, and an outer surface of the inner curved wall 324. In operation, each panel gap 333 and 334 is configured to receive and retain at least a portion of a complementary-shaped curved panel. The panel engagers 322 may include more or less panel gaps than shown, depending on the number of panels of a component.

Figure 16:
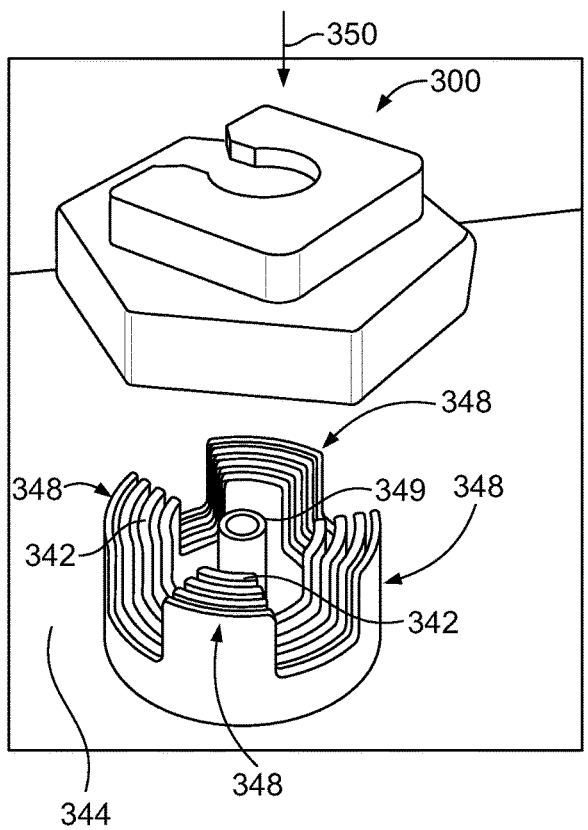
FIG. 16 illustrates a perspective view of a fastener mounting assembly aligned over panels of a component, according to an embodiment of the present disclosure.

FIG. 16 illustrates a perspective view of the fastener mounting assembly 300 aligned over panels 342 of a component 344, according to an embodiment of the present disclosure. As shown, the component 344 may include four sets 348 of curved panels 342. Referring to FIGS. 14-16, the fastener mounting assembly 300 is aligned over the panels 342 such that the central locating beam 318 is aligned over a central channel of a locating sleeve 349 extending from the component 344, and each panel engager 322 is aligned over a respective set 348 of curved panels 342 (such that at least one panel is aligned with a respective panel gap 332 or 333). The fastener mounting assembly 300 is then urged downwardly in the direction of arrow 350 such that the central locating beam 318 is received in the central channel of the locating sleeve 349 and the panel engagers 322 engage the panels 342.

Figure 17:
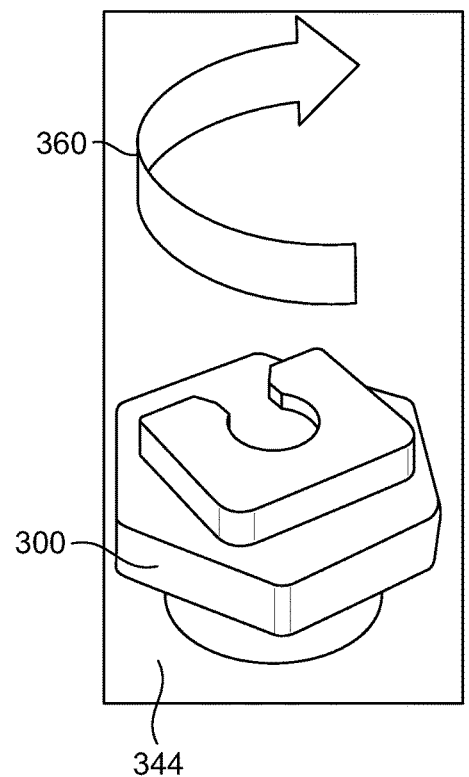
FIG. 17 illustrates a perspective view of a fastener mounting assembly secured to panels of a component, according to an embodiment of the present disclosure.

FIG. 17 illustrates a perspective view of the fastener mounting assembly 300 secured to the panels 342 (hidden from view in FIG. 17) of the component 344, according to an embodiment of the present disclosure. In order to securely mount the fastener mounting assembly 300 to the panels 342, the fastener mounting assembly 300 is rotated in the direction of arc 360. Referring to FIGS. 14-17 as the fastener mounting assembly 300 is rotated in the direction of arc 360, the panel engagers 322 dig into the panels 342, thereby securing thereto. For example, each panel engager 322 may include sharp edges that cut into respective panels 342. In at least one embodiment, interior walls of the panel engagers 322 may include barbs, clasps, or the like that dig into the panels 342 as the fastener mounting assembly 300 is rotated in the direction of arc 360. Optionally, instead of cutting features the walls of the panel engagers may include protuberances, such as bumps, studs, ribs, or the like, that provide an interference fit with the panels 342. For example, interference bumps may deflect the panels 342 into a bent position that securely connects the panel engagers 322 to the panels 342.

The fastener mounting assembly 300 may also include one or more structures, such as barbs, clasps, or the like, that resist rotation in a direction that is opposite from that of arc 360, in order to ensure that the fastener mounting assembly 300 remains securely fastened to the panels 342. As another example, spring fingers may be used to resist rotation in the direction that is opposite from that of arc 360.

Figures 18, 19:
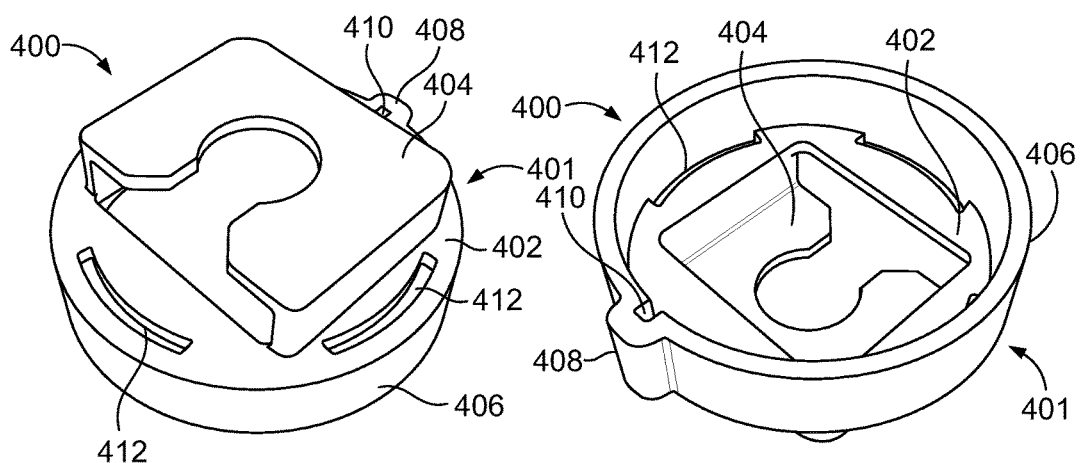
FIG. 18 illustrates a perspective top view of a fastener mounting assembly, according to an embodiment of the present disclosure.
FIG. 19 illustrates a perspective bottom view of a fastener mounting assembly, according to an embodiment of the present disclosure.

FIGS. 18 and 19 illustrate respective perspective top and bottom views of a fastener mounting assembly 400, according to an embodiment of the present disclosure. Referring to FIGS. 18 and 19, the fastener mounting assembly 400 includes a main body 401 having a base 402 that supports a fastener mount 404 (as described above). An annular collar 406 downwardly extends from outer edges of the base 402. A locating tab 408 defining an interior slot 410 radially extends outwardly from the collar 406. A plurality of panel-engaging members, such as arcuate heat stake channels 412, are formed through the base 402.

Figures 20, 21:
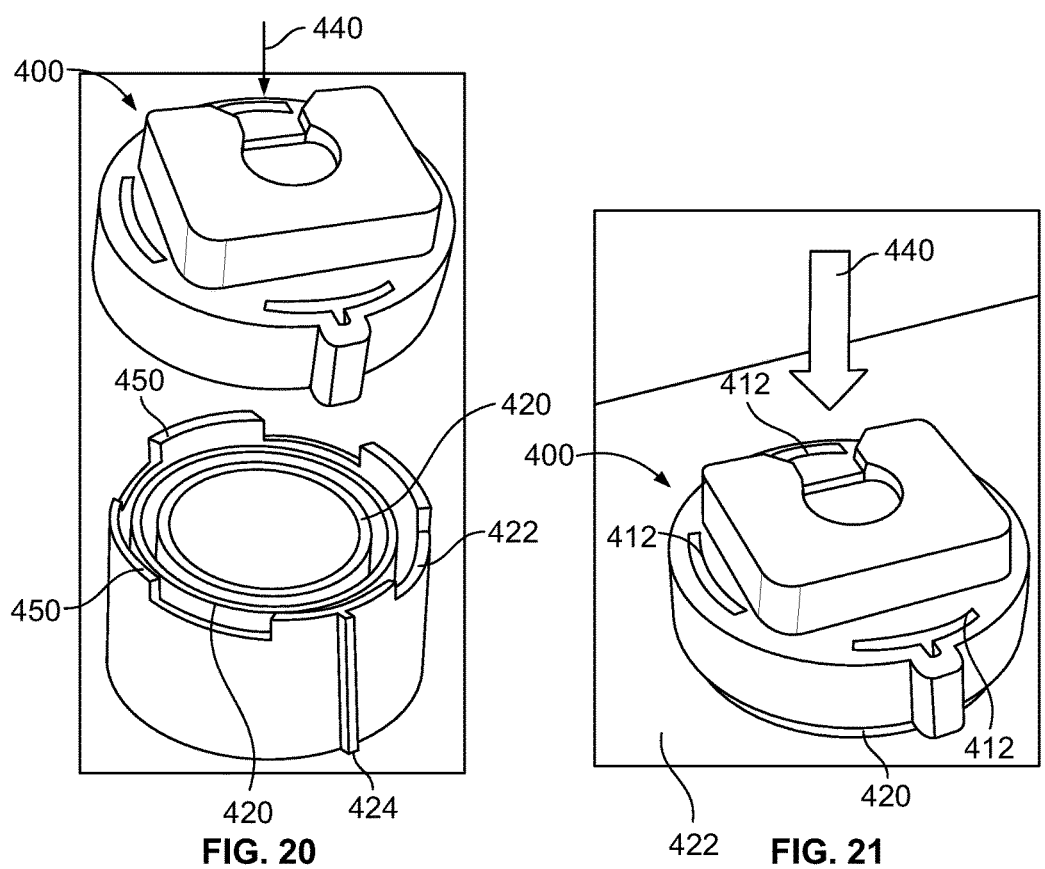
FIG. 20 illustrates a perspective view of a fastener mounting assembly aligned over panels of a component, according to an embodiment of the present disclosure.
FIG. 21 illustrates a perspective view of a fastener mounting assembly secured to panels of a component, according to an embodiment of the present disclosure.

FIG. 20 illustrates a perspective view of the fastener mounting assembly 400 aligned over circular panels 420 of a component 422, according to an embodiment of the present disclosure. The fastener mounting assembly 400 is aligned so that the collar 406 is positioned around the outermost panel 420 and the interior slot 410 of the locating tab 408 is aligned over a locating fin 424 that radially outwardly extends from the outermost panel 420. The fastener mounting assembly 400 is then urged over the panels 420 in the direction of arrow 440 so that the collar 406 fits around the outermost panel 420 and the locating fin 424 is retained within the interior slot 410.

FIG. 21 illustrates a perspective view of the fastener mounting assembly 400 secured to the panels 420 of the component 422, according to an embodiment of the present disclosure. Referring to FIGS. 18-21, after the fastener mounting assembly 400 is urged onto the panels 420 in the direction of arrow 440, heat staking equipment is used to generate heat through the heat stake channels 412, which then heat stakes at least the outermost panel 420 to the collar 406. The heat-staking connects at least the outermost panel 420 to the collar 406 by creating an interference fit therebetween. Upper ridges 450 (shown in FIG. 420) extending upwardly from the outermost panel 420 may be retained within the heat stake channels 412. A staking punch may be operated to compress the ridges 450 radially, thereby providing an interference fit between the ridges 450 and the collar 406, for example. As such, a permanent joint may be formed between the ridges 450 and the collar 406.

Figure 22:
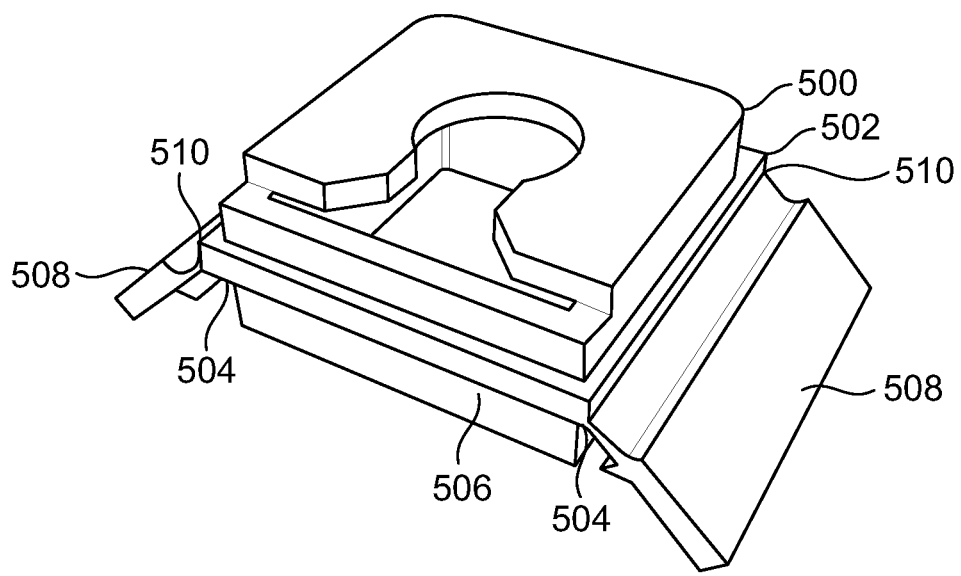
FIG. 22 illustrates a perspective top view of a fastener mount of a fastener mounting assembly, according to an embodiment of the present disclosure.

FIG. 22 illustrates a perspective top view of a fastener mount 500 of a fastener mounting assembly, according to an embodiment of the present disclosure. The fastener mount 500 may extend upwardly from a base 502 having opposed lateral walls 504 connected to opposed end walls 506. A deflectable retention wing 508 may pivotally connect to each lateral wall 504 about a hinge 510.

Figure 23:
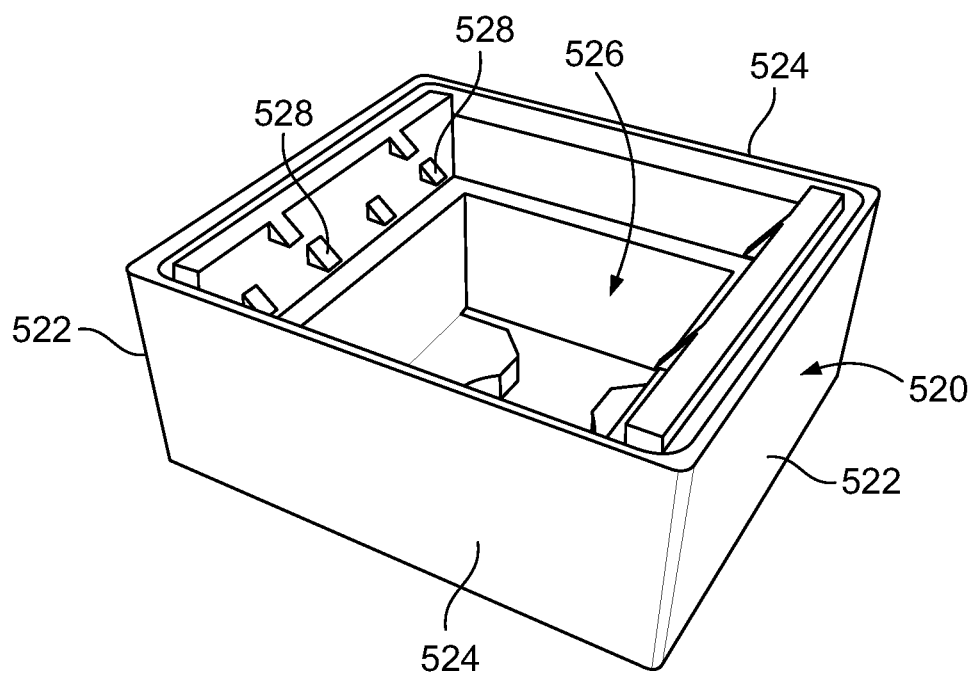
FIG. 23 illustrates a perspective top view of a securing collar of a fastener mounting assembly, according to an embodiment of the present disclosure.

FIG. 23 illustrates a perspective top view of a securing collar 520 of a fastener mounting assembly, according to an embodiment of the present disclosure. The securing collar 520 includes opposed lateral walls 522 connected to opposed end walls 524. A mount channel 526 is defined between the lateral walls 522 and the end walls 524. A plurality of piercing members 528, such as spikes, ramped edges, barbs, clasps, pins, or the like, inwardly extend from the lateral walls 522 into the mount channel 526. The securing collar 520 cooperates with the fastener mount 500 to form a fastener mounting assembly. The piercing members 528 and/or piercing members formed on inner surfaces of the deflectable retention wings 508 (shown in FIG. 22) provide panel-engaging members.

Figure 24:
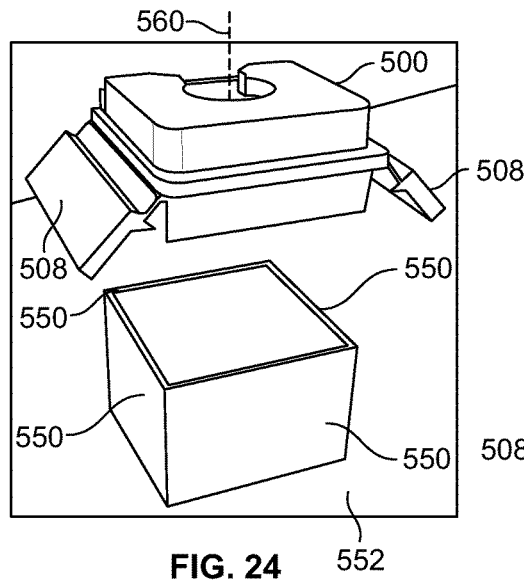
FIG. 24 illustrates a perspective view of a fastener mount aligned over panels of a component, according to an embodiment of the present disclosure.

FIG. 24 illustrates a perspective view of the fastener mount 500 aligned over panels 550 of a component 552, according to an embodiment of the present disclosure. As shown, the panels 550 provide an open box shape extending outwardly from the component 552. The fastener mount 500 is aligned over the panels 550 such that the lateral walls 504 and end walls 506 are positioned to be outside of an envelope of the panels 550. For example, a central longitudinal axis 560 is aligned with a center of the box formed by the panels 550.

Figure 25:
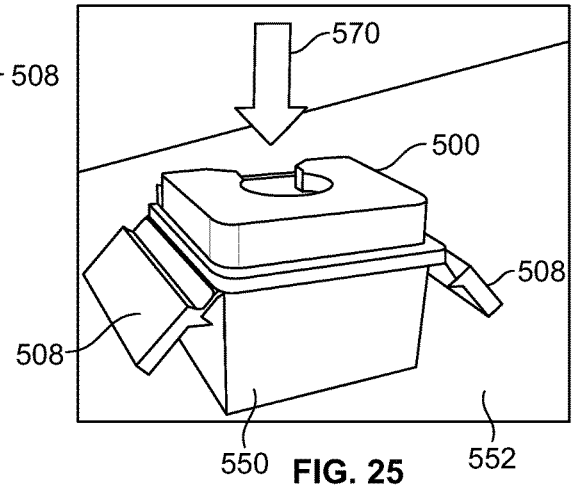
FIG. 25 illustrates a perspective view of a fastener mount positioned around panels of a component, according to an embodiment of the present disclosure.

FIG. 25 illustrates a perspective view of the fastener mount 500 positioned around the panels 550 of the component 552. After the fastener mount 500 is aligned with the panels 550, the fastener mount 500 is urged downwardly in the direction of arrow 570. The panels 550 may include a ledge or ridge that limits the downward movement of the fastener mount 500 in the direction of arrow 570.

Figure 26:
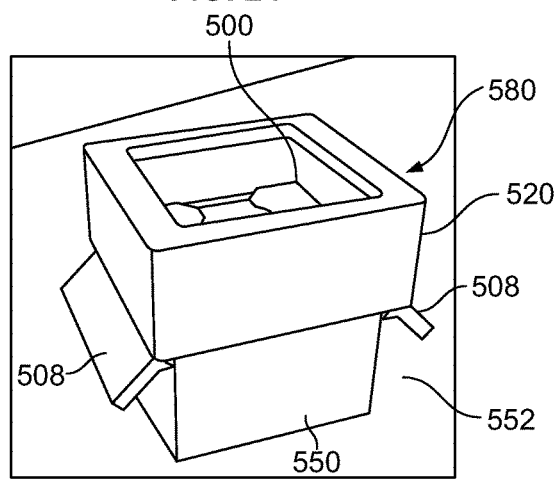
FIG. 26 illustrates a perspective view of a securing collar being slid over a fastener mount, according to an embodiment of the present disclosure.

FIG. 26 illustrates a perspective view of the securing collar 520 being slid over the fastener mount 500, according to an embodiment of the present disclosure. After the fastener mount 500 is positioned on the panels 550, the securing collar 520 is slid over the outer surfaces of the walls of the fastener mount 500, thereby deflecting the retention wings 508 inwardly toward the panels 550. The fastener mount 500 and the securing collar 520 cooperate to form the fastener mounting assembly 580.

Figure 27:
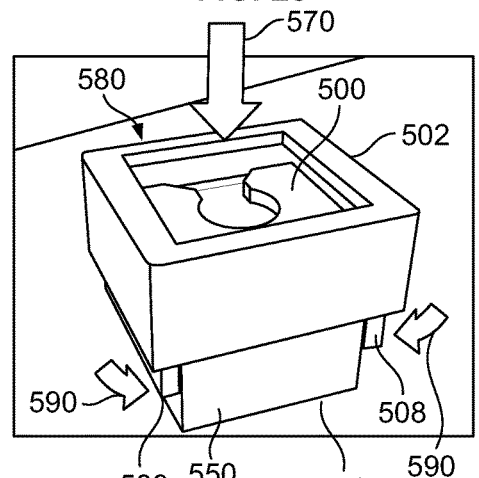
FIG. 27 illustrates a perspective view of a securing collar inwardly deflecting retention wings of a fastener mount onto outer surfaces of panels of a component, according to an embodiment of the present disclosure.

FIG. 27 illustrates a perspective view of the securing collar 520 inwardly deflecting the retention wings 508 of the fastener mount 500 onto outer surfaces of the panels 550 of the component 552, according to an embodiment of the present disclosure. As the securing collar 520 is further urged downward around the fastener mount 500 in the direction of arrow 570, the retention wings 508 are inwardly deflected in the directions of arcs 590 until they abut into the outer surfaces of lateral panels 550. Panel-engaging members (such as piercing members) extending from inner surfaces of the retention wings 508 dig into the lateral panels 550, while the piercing members 528 of the securing collar 520 dig into the end panels 550, for example. In this manner, the fastener mounting assembly 580 secures to the panels 550.

Figure 28:
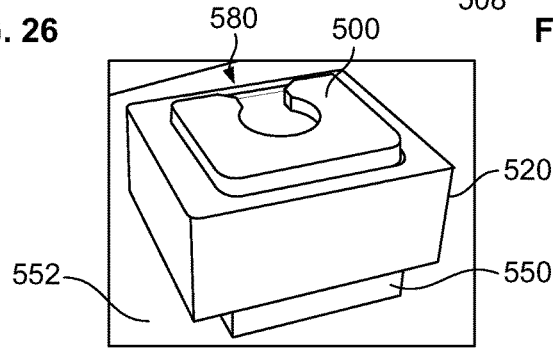
FIG. 28 illustrates a perspective view of a fastener mounting assembly secured to panels of a component, according to an embodiment of the present disclosure.

FIG. 28 illustrates a perspective view of the fastener mounting assembly 580 secured to the panels 550 of the component 552. As shown, the fastener mounting assembly 580 is securely fixed to the panels 550 and is configured to receive and retain a portion of a fastener.

Referring to FIGS. 1-28, embodiments of the present disclosure provide fastener mounting assemblies that may be securely mounted to panels of components. Instead of forming costly and intricate fastener mounts on components, embodiments of the present disclosure may be used to provide fastener mounting assemblies that may be quickly and easily secured to simple structural features, such as panels, formed on the component. Accordingly, the process of forming and manufacturing the component is simpler, less costly, and less labor intensive as compared to prior known processes. Additionally, embodiments of the present disclosure allow for attachment of a fastener to one or more features that may be otherwise too thin to form standard attachment features.

Embodiments of the present disclosure provide fastener mounting assemblies that may securely attach to simple panels on a component. The component may be formed without undercuts and special features that would otherwise be formed to receive a fastener. Further, the fastener mounting assemblies may be removed from the panels and interchanged with other fastener mounting assemblies that may be configured to retain different types of fasteners.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener mounting assembly configured to securely mount to at least one panel of a component, the fastener mounting assembly comprising:
   a base, wherein the base includes first and second surfaces;
   a fastener mount extending outwardly from the first surface of the base;
   at least one panel-engaging member connected to one or both of the base and the fastener mount, wherein the at least one panel-engaging member is configured to securely engage the at least one panel of the component to securely lock the fastener mounting assembly to the at least one panel, wherein the at least one panel-engaging member comprises a plurality of panel-engaging legs extending outwardly from the second surface of the base, and wherein the at least one panel is configured to be secured within a gap between two of the plurality of panel-engaging legs;
   a pin-receiving sleeve extending from an end of the base; and
   a pin moveably retained within the pin-receiving sleeve, wherein the pin is configured to pass through the plurality of panel-engaging legs and the at least one panel to securely connect the fastener mounting assembly to the at least one panel.

2. The fastener mounting assembly of claim 1, wherein the pin includes a head connected to a serrated shaft having a beveled piercing tip.

3. The fastener mounting assembly of claim 1, wherein each of the panel-engaging legs includes a flat beam and an inwardly-canted tip extending from a distal end of the flat beam.

4. The fastener mounting assembly of claim 1, further comprising a stabilizing block extending outwardly from the second surface of the base between at least two of the plurality of panel-engaging legs.

5. The fastener mounting assembly of claim 1, wherein the fastener mounting assembly includes at least one locating ridge configured to be retained within at least one divot formed in the at least one panel.

6. The fastener mounting assembly of claim 1, wherein the fastener mount comprises opposed lateral walls connected to an end wall and a canopy, wherein a fastener-receiving channel is formed through the canopy, and wherein the fastener-receiving channel includes a circular central opening that connects to an inlet that angles outwardly from the central opening toward an open end that is distally located from the end wall.

7. A system comprising:
   a component including a surface having at least one panel extending from the surface; and
   a fastener mounting assembly that securely mounts to the at least one panel of the component, the fastener mounting assembly comprising:
   a base, wherein the base includes first and second surfaces;
   a fastener mount extending outwardly from the first surface of the base;
   at least one panel-engaging member connected to one or both of the base and the fastener mount, wherein the at least one panel-engaging member securely engages the at least one panel of the component to securely lock the fastener mounting assembly to the at least one panel, wherein the at least one panel-engaging member comprises a plurality of panel-engaging legs extending outwardly from the second surface of the base, wherein the at least one panel includes a plurality of flat panels, and wherein each of the plurality of flat panels is configured to be secured within a gap between two of the plurality of panel-engaging legs;
   a pin-receiving sleeve extending from and end of the base; and
   a pin that is moveably retained within the pin-receiving sleeve, wherein the pin passes through the plurality of panel-engaging legs and the plurality of flat panels to securely connect the fastener mounting assembly to the plurality of flat panels, and wherein the pin-receiving sleeve includes at least one locating ridge.

8. The system of claim 7, wherein each of the panel-engaging legs includes a flat beam and an inwardly-canted tip extending from a distal end of the flat beam, wherein each of the plurality of flat panels secures within a gap between two of the plurality of panel-engaging legs, and wherein the at least one locating ridge is configured to be retained within at least one divot formed in each of the plurality of flat panels.

* * * * *